Nov. 23, 1926.
J. CONWAY
OIL SEPARATOR
Filed Dec. 8, 1925
1,608,016
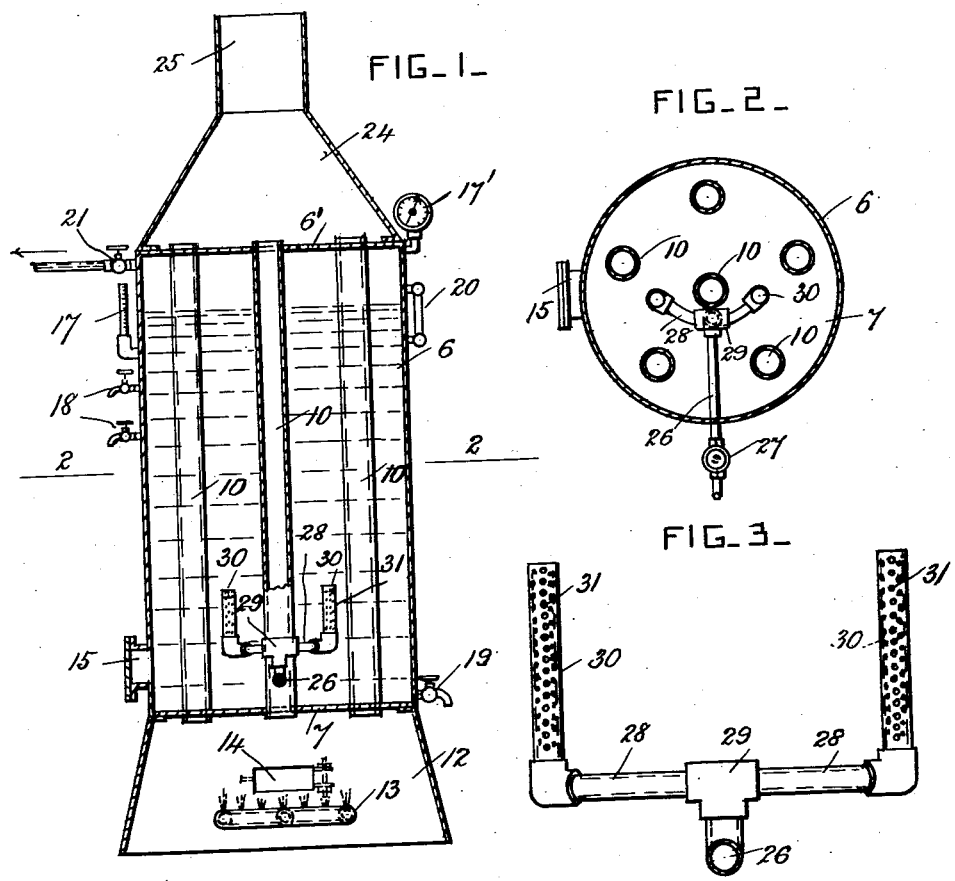

Patented Nov. 23, 1926.

1,608,016

UNITED STATES PATENT OFFICE.

JAMES CONWAY, OF DRUMRIGHT, OKLAHOMA.

OIL SEPARATOR.

Application filed December 8, 1925. Serial No. 74,023.

This invention relates to devices for treating crude oil as it comes from the oil well and separating the good oil from the water, dirt and other impurities which are mixed with it; and it consists in the novel construction and combination of the parts hereinafter fully described and claimed.

In the drawings, Figure 1 is a vertical section through an oil separator constructed according to this invention. Fig. 2 is a sectional plan view, taken on the line 2—2 in Fig. 1. Fig. 3 is a detail front view of the spray pipes removed from the separator, and is drawn to a larger scale.

A cylindrical vessel 6 for water is provided, and has a tube plate 6' at its top, and a tube plate 7 at its bottom. Heating tubes 10 extend vertically between the tube plates, so that they heat the water in the vessel 6. A fire-box 12 is provided under the lower tube plate, and means are provided in the fire-box for heating the water in the vessel 6, such as a gas burner 13, or oil burner, or a grate for fuel. The fire-box has any suitable fire door 14, through which air can be admitted. The water vessel 6 is provided with a hand hole 15, a steam pressure gage 17, a temperature gage 17', blow-off valves 18, a sludge valve 19, and an oil and water gage 20, all of which are of any approved construction. The water vessel 6 is also provided with an outlet valve 21 for clean oil at its upper part. A conical smoke-box 24 is arranged above the top tube plate, and is provided with a chimney 25.

An inlet pipe 26 for the crude oil is provided and projects inside the lower part of the water vessel 6, and is provided with an inlet valve 27. The inlet pipe 26 has two or more horizontal branch pipes 28 secured to it by a junction piece 29, and 30 are vertical pipes secured to the branch pipes 28 and provided with a multiplicity of small perforations 31. These perforated pipes are arranged between the lower parts of the heating tubes, and project upwardly for a predetermined distance in the water.

The crude oil is forced laterally through the small perforations 31 of the pipes 30, and ascends through the water in small streams. The water in the vessel 6 is heated to a predetermined temperature, and the impurities and water in the crude oil are separated from it as it rises through the hot water. The clean oil floats on the water, and flows out of the outlet valve 21, and may be given any additional cleaning treatment in a separate device, if necessary.

The water in the vessel 6 is heated in an inexpensive manner, and the oil is separated from its impurities in a satisfactory manner, by the use of this separator.

What I claim is:

In an oil separator, a vessel for water provided with tube plates at its top and bottom, a fire-box arranged below the bottom tube plate, a smoke-box arranged above the top plate and provided with a chimney, straight heating tubes for the water extending between the two tube plates, perforated spray pipes for oil arranged vertically between the lower parts of the heating tubes in the water space between them, an inlet pipe for oil projecting through the side of the vessel, and branch pipes connecting the inlet pipe with the lower ends of the spray pipes.

In testimony whereof I have affixed my signature.

JAMES CONWAY.